US006584434B1

(12) United States Patent
Schick et al.

(10) Patent No.: US 6,584,434 B1
(45) Date of Patent: Jun. 24, 2003

(54) METHOD FOR DATA FILTERING AND ANOMOLY DETECTION

(75) Inventors: Louis Andrew Schick, Delmar, NY (US); Douglas Ancona Catharine, Scotia, NY (US); Stephen Duane Sanborn, Copake, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/556,987

(22) Filed: Apr. 24, 2000

(51) Int. Cl.[7] .......................... G06F 15/00; H03F 1/26

(52) U.S. Cl. .......................................... 702/190

(58) Field of Search .......................... 702/190; 379/112; 370/286; 364/555, 572, 550, 900; 385/12; 235/455; 84/603

(56) References Cited

U.S. PATENT DOCUMENTS 3,958,187 A * 5/1976 Suzuki et al. ................ 331/74
4,101,072 A * 7/1978 Weaver et al. ............. 235/455
4,143,417 A * 3/1979 Wald et al. ................ 364/900
5,239,456 A * 8/1993 Badavas et al. ............. 700/34
5,392,226 A * 2/1995 Hamilton .................... 364/555
5,696,700 A * 12/1997 O'Brien, Jr. et al. ....... 364/550
5,737,399 A * 4/1998 Witzmann et al. .......... 379/112
5,764,538 A * 6/1998 Cheiky-Zelina ............ 364/555
5,777,900 A * 7/1998 Takeuchi et al. ........... 364/572
5,870,699 A * 2/1999 Canada et al. ............. 702/190
5,937,100 A * 8/1999 Kitajima ..................... 702/194
5,949,953 A * 9/1999 Shirakawa et al. ......... 379/112
5,978,525 A * 11/1999 Shu et al. ..................... 385/12
5,995,493 A * 11/1999 Van de Kerkhof .......... 370/286
6,065,094 A * 5/2000 Akiyama .................... 702/189
6,069,309 A * 5/2000 Monahan et al. ............. 84/603
6,078,874 A * 6/2000 Piety et al. ................. 702/122
6,084,911 A * 7/2000 Ishikawa ................... 370/286
6,122,605 A * 9/2000 Drees et al. ................ 702/194
6,205,499 B1 * 3/2001 Houlberg et al. ........... 364/550
6,211,814 B1 * 4/2001 Benjamin et al. ........... 702/122
6,272,446 B1 * 8/2001 Baekke et al. .............. 702/189
6,434,196 B1 * 8/2002 Sethuraman et al. ........ 364/572
2002/0110275 A1 * 8/2002 Rogina et al. .............. 702/190

FOREIGN PATENT DOCUMENTS

EP 0 526 885 A2 * 5/1992 .......... H04N/7/133

* cited by examiner

*Primary Examiner*—John Barlow
*Assistant Examiner*—Aditya Bhat
(74) *Attorney, Agent, or Firm*—John F. Thompson; Patrick K. Patnode

(57) ABSTRACT

A method for low pass filtering data used in change-detect compression of data collected from a system includes buffering the data from said system. Rolling averages of the buffered data are calculated where the calculation of the rolling averages low pass filters the data. Change-detect compression is performed on the rolling averaged data, and the compressed data are archived. The archived data are transmitted to a central location and received. The received data are archived at the central location.

12 Claims, 3 Drawing Sheets

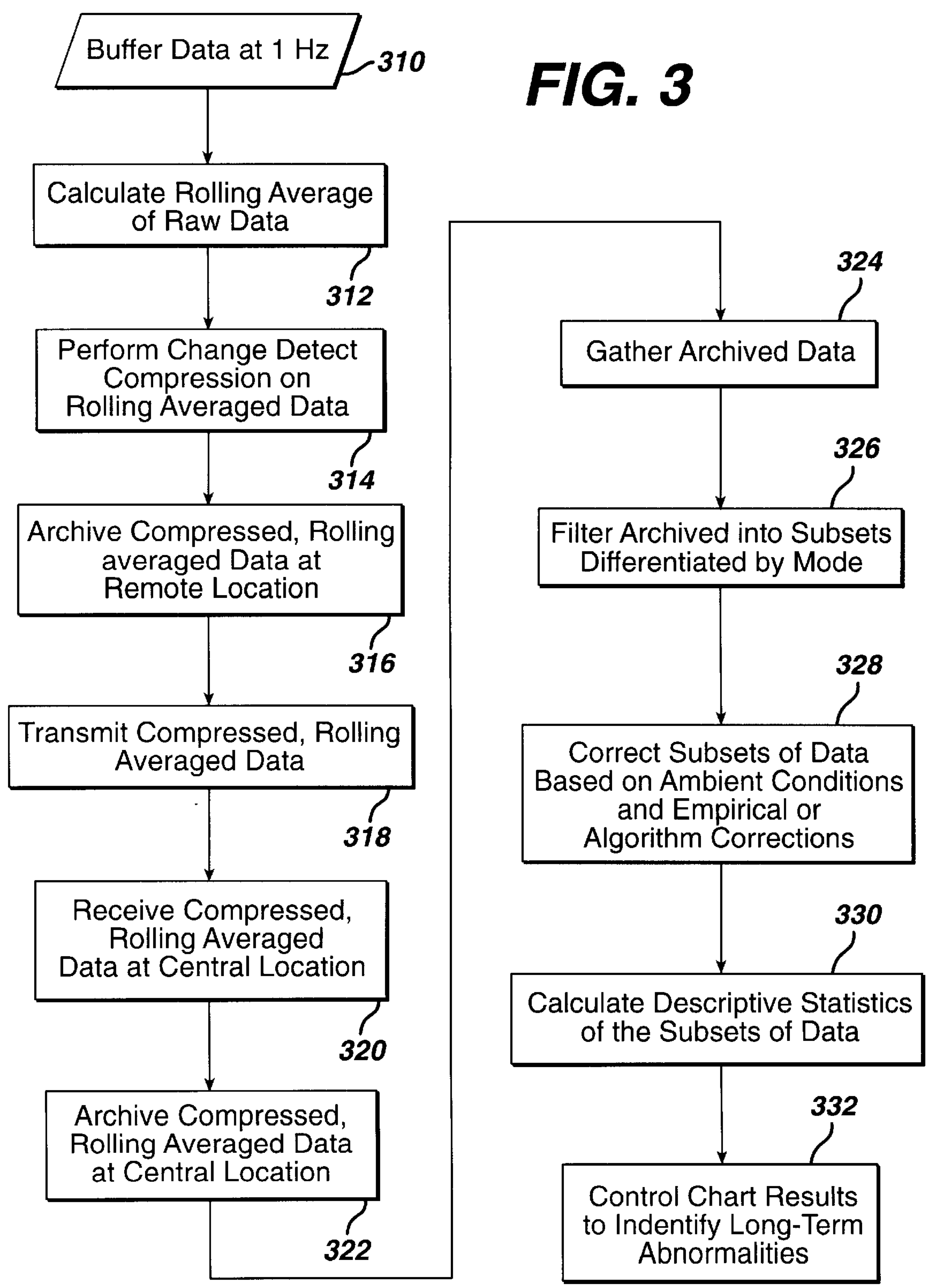
Buffer Data at 1 Hz
310
FIG. 3
Calculate Rolling Average of Raw Data
312
Perform Change Detect Compression on Rolling Averaged Data
314
Archive Compressed, Rolling averaged Data at Remote Location
316
Transmit Compressed, Rolling Averaged Data
318
Receive Compressed, Rolling Averaged Data at Central Location
320
Archive Compressed, Rolling Averaged Data at Central Location
322
324
Gather Archived Data
326
Filter Archived into Subsets Differentiated by Mode
328
Correct Subsets of Data Based on Ambient Conditions and Empirical or Algorithm Corrections
330
Calculate Descriptive Statistics of the Subsets of Data
332
Control Chart Results to Indentify Long-Term Abnormalities

METHOD FOR DATA FILTERING AND ANOMOLY DETECTION

BACKGROUND OF THE INVENTION

The present invention relates to data filtering and anomaly detection, and more particularly to improved change-detect data compressing using a rolling average of the data as a low pass filter and mode based statistical process control for anomaly detection.

Optimal operational characteristics for modern gas turbine systems include high operational efficiency, low exhaust and long operational life. To obtain these operational characteristics, monitoring the operational parameters of the gas turbine system becomes desirable. When monitoring the operational parameters of the gas turbine system, data relating to the physical and operational conditions of the gas turbine system are collected and analyzed. The data are collected from a large number of locations on, in or near the gas turbine system to accurately assess the operational characteristics of the gas turbine system. The data relating to the operational parameters are particularly meaningful when the data are collected at high frequencies (i.e., one data point every one or two seconds) and when the collected data are compared to historical data that has been archived and collected over a large temporal range (i.e., days, months or years).

Collecting data from a large number of locations at a high frequency presents many problems. For example, the total amount of data collected are very large. When the gas turbine system is located at a remote location, local archiving of the large amount of collected data becomes problematic. As such, the large amount of collected data typically requires expensive storage devices for proper data archiving. In addition, transmitting the large amount of collected data from the remote location to a central location requires a long transmission time. Therefore, the costs related to transmission of the data are high. Thus, it is desired to filter the data before archiving at the remote site and transmitting to a central location while maintaining the statistical and informational integrity of the total amount of collected data.

With the large amount of data collected from the number of locations, interpretation of the collected data also becomes difficult. Typically, the data are analyzed to determine the overall operational characteristics of the gas turbine system. When assessing the overall condition of the gas turbine system, pinpointing the exact problem involves laborious troubleshooting. As such, the large amount of data from different locations becomes meaningless unless the data are correlated to an operational condition of the gas turbine system. Therefore, it is desired that the collected data be sorted and assessed to accurately pinpoint any potential problems relating to the operational conditions of the gas turbine system without the need for undue troubleshooting.

BRIEF SUMMARY OF THE INVENTION

A method is disclosed for filtering and determining anomalies of corrected data from a system under test. The method comprises buffering the data from the system under test. Rolling averages of the buffered data are calculated wherein the calculation of the rolling averages low pass filters the buffered data. Change-detect compression is performed on the rolling averaged data, and the compressed data are archived. The archived data are transmitted to a central location, and the transmitted data are received at the central location. The received data are archived at the central location. The archived data are gathered at the central location. The gathered data are filtered into at least one subset that is differentiated by mode. The at least one subset is corrected, and distributive statistics are calculated on the at least one subset to identify long-term anomalies in the at least one subset.

BRIEF DESCRIPTION OF THE DRAWINGS

FIG. 3 illustrates a flow chart of one exemplary embodiment of a method for filtering and detecting anomalies of the collected data from the operation of a system.

DETAILED DESCRIPTION OF THE INVENTION

Figure 1:
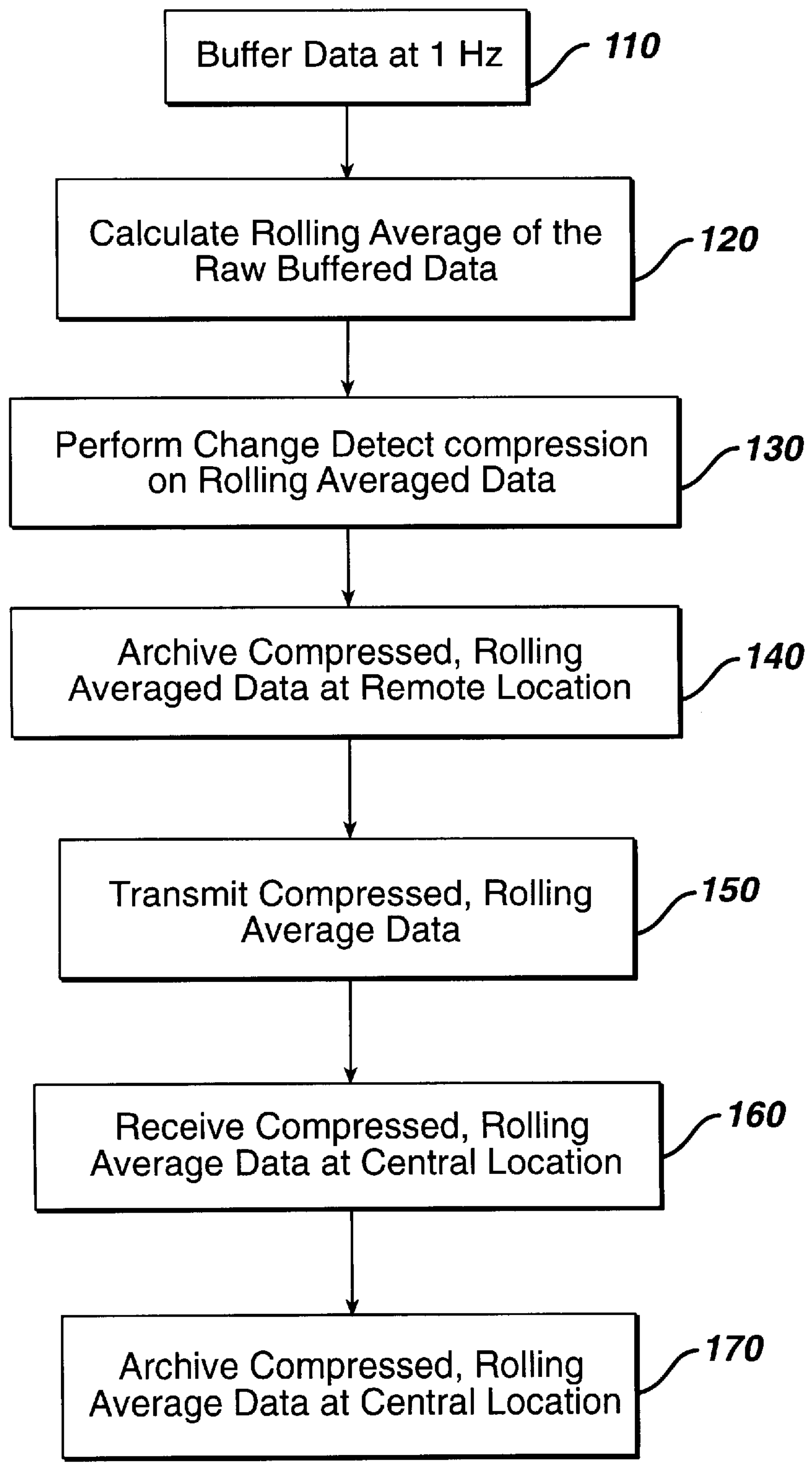
FIG. 1 illustrates a flow chart of one exemplary embodiment of a method for low pass filtering data collected from a system.

In gas turbine systems, data are monitored and collected to control the operation of the gas turbine system and to diagnose problems or changes in the physical and operational conditions of the gas turbine system. For example, in one embodiment, a gas turbine control system monitors exhaust gas thermocouples to determine the exhaust temperature of the gases exiting the gas turbine system. The gas turbine control system uses the exhaust temperature to adjust various parameters relating to the operation of the gas turbine system, such as, for example, fuel intake, to maintain the highest operational efficiency with low exhaust emissions. It should be appreciated that the present invention encompasses other types of monitored data, such as, for example, exhaust composition, bearing temperature, inlet filter pressure, wheel space temperature, fuel heating value, fuel composition, inlet air temperature, ambient temperature and vibration information. It should also be appreciated that the present invention encompasses systems other than a gas turbine system and expressly encompasses any other system under test in which the operational characteristics are monitored.

In addition to controlling the operation of the gas turbine system, the monitored and collected data are compared to archived data to diagnose potential problems with the physical and operational characteristics of the gas turbine system. In one embodiment, mode based statistical process control is performed by filtering the data into subsets differentiated by mode. The subsets of data are compared to archived data to detect abnormalities and/or anomalies. If an anomaly is detected in the subset of data, the abnormal operation can be pinpointed to a specific operational condition defined by the mode of the subset. Therefore, specific maintenance and/or service can be performed specified by the operational condition defined by the mode of the subset of data for which the anomaly was detected.

In one embodiment, the gas turbine system itself includes approximately 200 sensors connected on, in or near the gas turbine. In another embodiment, the plant housing the gas turbine system can include over 1000 sensors. The data are collected at a relatively high frequency from each sensor, such as, for example, one data point every two seconds. At this frequency, thirty data points are collected per minute and 1800 data points are collected per hour for each sensor in the gas turbine system. Therefore, in these embodiments, given a data measurement frequency of one data point every two seconds, the amount of data can range between about 360,000 to over 1,800,000 data points per hour. In one aspect, the data can be collected until a predetermined number of data points are recorded. In another aspect, the data are collected over a predetermined amount of time. It should be appreciated that the present invention encompasses data collected at higher or lower rates than one data point per every two seconds.

In another embodiment, the gas turbine system is located remotely from a central location where the data analysis is performed. The central location includes control and analysis equipment such as computers to control the operation of the gas turbine system and uses the collected data to perform statistical analyses. Also, the collected data are archived at the remote location and transmitted to the central location at a predetermined time interval. In one embodiment, the collected data are transmitted via a telephone connection. It should be appreciated that the data can be transmitted using other transmission techniques, and the transmission techniques are not limited to those disclosed herein.

In one exemplary embodiment, the data are low pass filtered and used in change-detect compression. It should be appreciated that, for convenience, one embodiment is described using the collection and analysis of one portion of data. However, the embodiments discussed herein can be applied to the collection and analysis of all data collected from the gas turbine and/or the plant that houses the gas turbine system.

As shown in FIG. 1, data from the gas turbine system are buffered (step 110) in raw form directly from the sensors. In a preferred embodiment, the data are buffered at a frequency of one hertz. In another embodiment, the data are buffered in a dynamic memory device. The data comprise a plurality of data points that relate to the operational and/or physical characteristics of the gas turbine system. Once the data are buffered (step 110), a rolling average of the raw buffered data is performed (step 120). In one embodiment, a rolling average takes the average of five data points, for example. First, five data points are averaged to produce a first rolling average. The five data points are the first five data points received from the gas turbine system. Then, the oldest data point is dropped and a new data point is added to the four data points that are left. The new five data points are averaged to produce a second rolling average. Again, the oldest data point is dropped, and a new data point is added to the four data points that are left. The new five data points are averaged to produce a third rolling average. This rolling average is continuously performed on the raw buffered data in the manner disclosed herein. It should be appreciated that the averaging of five data points is one embodiment, and the present invention expressly encompasses other numbers of data points used to calculate the rolling average. Performing the rolling average of the raw buffered data substantially reduces any high frequency random noise that is present in the data. Thus, the raw buffered data are low pass filtered by the calculation of the rolling average.

After performing the rolling average (step 120), change-detect compression is performed on the rolling averaged data points (step 130). In one embodiment, the change-detect compression records data only when the current data point under evaluation has a change/delta that is larger than a predetermined change/delta. The predetermined change/delta is termed as the zero band or dead band. The change-detect compression results in accurate identification of large changes because any high frequency noise has been filtered out by the rolling average.

In the embodiment discussed above, the rolling average of every five data points maintains the statistical and informational integrity of the total number of collected data points while the change-detect compression reduces the number of data points under analysis. For example, with the exhaust temperature data, the combination of a five point rolling average with a two degree Fahrenheit statistical deviation results in a reduction from about 700 data points per hour (1 degree statistical deviation without rolling average) to about 20 data points per hour while preserving the informational content of the total amount of data. Therefore, the combination of the rolling average and the change-detect compression reduces the data required for analysis of the operational characteristics of the gas turbine.

After the change-detect compression is performed (step 130), the compressed, rolling averaged data are archived (step 140). In one embodiment, the data are archived over a predetermined amount of time. In another embodiment, the archiving of the data is performed in a dynamic memory location or on a magnetic media. The compressed, rolling averaged data are transmitted, for example, to a central location (step 150). In one embodiment, the compressed, rolling averaged data are archived for two hours and then transmitted to the central location. In another embodiment, the data are transmitted via a telephone connection. However, it should be appreciated that the data can be transmitted by other methods of transmitting data.

After the data are transmitted (step 150), the data are received at the central location (step 160). Once the data are received (step 160), the received data are archived at the central location (step 170). It should be appreciated that after the compressed, rolling averaged data are transmitted, the data that was archived at the remote location can be deleted or over-written with new compressed, rolling averaged data. In one embodiment, the received data are archived on a magnetic medium. It should be appreciated that statistical analysis may be performed on the archived data to further identify abnormalities and/or anomalies in the data that require further investigation.

Figure 2:
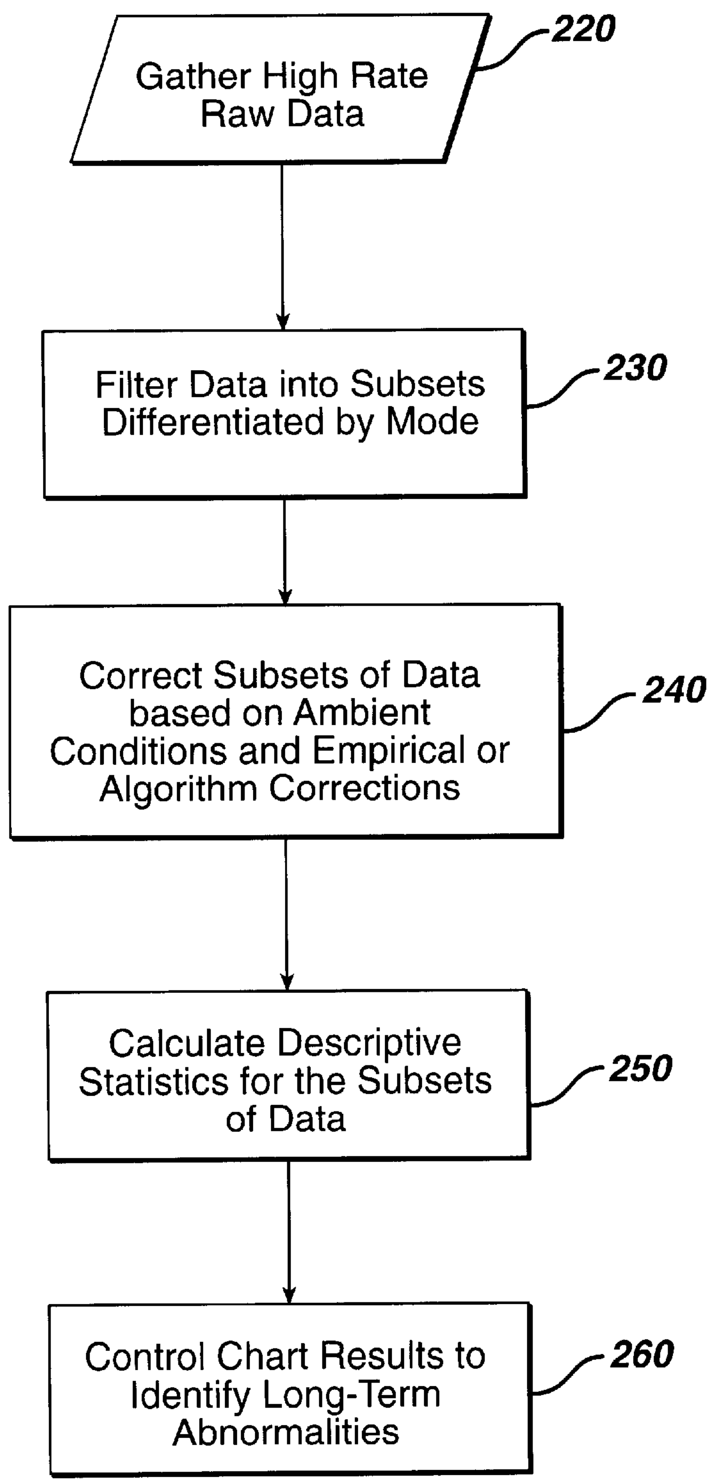
FIG. 2 illustrates a flow chart of one exemplary embodiment of a method of mode based statistical process control to detect anomalies in the data collected from the operation of a system.

In another exemplary embodiment, anomalies in the data collected from the gas turbine system are detected using mode based statistical process control. As shown in FIG. 2, the high rate data are gathered from, for example, an archived location (step 220). In one embodiment, the data are collected from sensors monitoring the operation of the gas turbine system. In another embodiment, the data are provided after performing the rolling average and change-detect compression. It should be appreciated that, in a preferred embodiment, the anomaly detection is performed on archived data in a batch process, and the archived data are analyzed at various times after the data has been collected. As such, the gathering of the data (step 220) may be performed at a time later than the collection of the data from the gas turbine system.

In addition, the operational characteristics also relate to specific service and maintenance procedures relating to the operational characteristics of the gas turbine system. Once the data are correlated to an operational characteristic, a statistical analysis of the correlated data determines whether the particular service or maintenance procedures need to be performed.

The data points are filtered into subsets of data that are differentiated by mode (step 230). The filtering of the data involves correlating similar data into subsets of data that relate to various operational characteristics, defined as modes, of the gas turbine system. The operational characteristics or modes can be used to diagnose potential problems associated with the physical and operational conditions of the gas turbine. In one embodiment, a mode represents an operational characteristic or operating condition for which constant values are expected. In another embodiment, a mode represents an operational characteristic or operating condition for which a known deterministic function, such as a degradation slope, is expected. A mode can comprise an operational characteristic or operating condition that is associated with a predetermined function performed by the gas turbine system, such as, for example, operational efficiency or vibrational characteristics of the gas turbine system. In an exemplary mode, data that relate to the exhaust temperature can be filtered into a subset of data and analyzed to determine changes in leakage flows that indicate wear in the combustion area of the gas turbine system. In another exemplary mode, data relating to the bearing metal temperature can be filtered into a subset and analyzed to determine changes in bearing loading and/or bearing casing slippage. In even another exemplary mode, data relating to inlet filter pressure can be filtered into a subset and analyzed to determined whether the inlet filter requires cleaning or needs to be replaced. In yet another exemplary mode, data relating to wheel space temperature can be filtered into a subset and analyzed to determine problems with the wheel space of the gas turbine system that require immediate service. It should be appreciated that other data can be filtered into a variety of subsets based on mode and analyzed to determine the operational characteristics of the gas turbine system, and the present invention should not be limited only to those modes discussed herein.

Once filtered, the data are corrected to correct for ambient conditions and/or empirical or algorithm corrections (step 240). In one embodiment, the correction of the data points allows data collected over a variety of ambient conditions to be compared and analyzed. After the data are corrected (step 240), descriptive statistics can be calculated on the subset of data (step 250). For example, the descriptive statistics can include a trend analysis, mean, standard deviation and [certosis] kurtosis. From the descriptive statistics (step 250), long term abnormalities/anomalies of the operation of gas turbine system are identified (step 260). In one embodiment, the long-term abnormalities/anomalies are identified using control chart results on the subsets of data. Based on the abnormalities/anomalies identified (step 260), remedial service actions can be performed on the gas turbine system. The remedial service actions relate to the operating condition identified by the mode of the subset of data. As such, the filtering of data into subsets and the statistical analysis of the subsets allows potential problems in the operation of the gas turbine system to be identified from the analysis of the data without undue manual troubleshooting.

In even another exemplary embodiment as shown in FIG. 3, data are buffered from the gas turbine system at a frequency of, for example, one hertz (step 310). Rolling averages of the raw buffered data are calculated (step 312). Once the rolling averages are calculated (step 312), change-detect compression is performed on the rolling averaged data (step 314). The change-detect compression has been explained herein above. The compressed, rolling averaged data are archived at a remote location (step 316) when the gas turbine system is located remotely from a central location. After the data are archived (step 316), the compressed, rolling averaged data are transmitted (step 318). The transmission of the average data points can be accomplished over, for example, a telephone connection or any other method of transmitting data. The transmitted data are received at the central location (step 320).

Once the data are received (step 320), the data are archived at the central location (step 322). After archiving, the data are gathered (step 324). The data are filtered into subsets of data differentiated by mode (step 326). Mode has been defined above. The subsets of data are corrected based on ambient conditions and/or empirical or algorithm corrections (step 328). Descriptive statistics are performed on the subsets of data (step 330). The descriptive statistics comprise, for example, trend analysis, mean, standard deviation, [certosis] kurtosis. Long term abnormalities/anomalies are identified in the subsets of data (step 332). From this identification, the operation of the gas turbine system is diagnosed and remedial service actions can be performed, if needed. As stated earlier, this exemplary embodiment filters the amount of data points while maintaining the statistical and informational integrity of the total amount of collected data. In addition, the filtering of the data into subsets and the statistical analysis of the subsets allows for pinpoint diagnosis of the physical and operational conditions of the gas turbine system which promotes higher operational efficiency, lower emissions and longer operational life.

The foregoing discussion of the invention has been presented for purposes of illustration and description. Further, the description is not intended to limit the invention to the form disclosed herein. Consequently, variations and modifications commensurate with the above teachings, and with the skill and knowledge of the relevant art, are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method for low pass filtering data used in change-detect compression of said data collected from a system under test, said method comprising the steps of:

buffering said data from said system under test at a frequency of about one hertz;

calculating rolling averages of the buffered data wherein said step of calculating said rolling averages low pass filters the buffered data;

performing change-detect compression on the rolling averaged data wherein said step of performing said change-detect compression calculates a change-delta and compares said calculated change-delta with a predetermined change-delta for each of said rolling averaged data; and archiving the compressed data.

2. The method of claim 1 further comprising the steps of:

transmitting the archived data points to a central location;

receiving the transmitted data at said central location; and archiving the received data at said central location.

3. The method of claim 1, wherein said step of archiving the compressed data comprises archiving the compressed data a predetermined amount of time.

4. The method of claim 1, wherein said step of calculating said rolling average comprises continuously calculating said rolling average of said data.

5. The method of claim 1, further comprising the step of over-writing the archived data after said step of transmitting the archived data.

6. The method of claim 1, further comprising the step of deleting the archived data after said step of transmitting the archived data.

7. The method of claim 1, wherein said step of archiving the compressed data comprises archiving the compressed data points in a dynamic memory location.

8. The method of claim 1, wherein said step of archiving the compressed data comprises archiving the compressed data on a magnetic medium.

9. The method of claim 1, wherein said step of archiving the received data at said central location comprises archiving the received data on a magnetic medium.

10. A method for filtering and determining anomalies of corrected data from a system under test, said method comprising the steps of:

buffering said data from said system under test;

calculating rolling averages of the buffered data wherein said step of calculating said rolling averages low pass filters the buffered data wherein said step of performing said change-detect compression calculates a change-delta and compares said calculated change-delta with a predetermined change-delta for each of said rolling averaged data;

performing change-detect compression on the rolling averaged data;

archiving the compressed data;

transmitting the archived data points to a central location;

receiving the transmitted data at said central location;

archiving the received data at said central location gathering the archived data from said central location;

filtering said gathered data into at least one subset, each of said at least one subset being differentiated by mode;

correcting said at least one subset of the gathered data;

calculating distributive statistics for said each of said at least one subset; and identifying long-term anomalies in said at least one subset.

11. The method of claim 10, wherein said mode comprises an operating condition of said system under test for which constant values are expected.

12. The method of claim 10, wherein said mode comprises a known deterministic function of operating said system under test.

* * * * *